United States Patent [19]

Chapin, Jr.

[11] Patent Number: 5,883,377
[45] Date of Patent: Mar. 16, 1999

[54] MULTIPLE MAGNETIC STRIPE TRANSACTION CARDS AND SYSTEMS FOR THE UTILIZATION THEREOF

[75] Inventor: Stephen R. Chapin, Jr., Ellicott City, Md.

[73] Assignee: International Card Technologies, Inc., Ellicott City, Md.

[21] Appl. No.: 560,585

[22] Filed: Nov. 20, 1995

[51] Int. Cl.[6] .................................................. G06K 19/06
[52] U.S. Cl. ........................................ 235/493; 235/487
[58] Field of Search .................................. 235/493, 449, 235/487, 380, 448, 375; 283/904, 107, 108, 114

[56] References Cited

U.S. PATENT DOCUMENTS

| | | | |
|---|---|---|---|
| 4,507,550 | 3/1985 | Fleer | 235/449 |
| 4,609,812 | 9/1986 | Drexler | 235/487 |
| 4,634,848 | 1/1987 | Shinohara et al. | 235/449 |
| 4,645,916 | 2/1987 | Raisleger | 235/494 |
| 4,659,914 | 4/1987 | Kondo et al. | 235/380 |
| 4,752,676 | 6/1988 | Leonard et al. | 235/379 |
| 4,806,740 | 2/1989 | Gold et al. | 235/449 |
| 4,899,037 | 2/1990 | Marechal et al. | 235/493 |
| 4,937,436 | 6/1990 | Eglise et al. | 235/380 |
| 5,023,436 | 6/1991 | Takada et al. | 235/380 |
| 5,128,524 | 7/1992 | Anglin et al. | 235/449 |
| 5,326,964 | 7/1994 | Risser | 235/487 |
| 5,440,108 | 8/1995 | Tran et al. | 235/381 |
| 5,506,395 | 4/1996 | Eppley | 235/486 |

FOREIGN PATENT DOCUMENTS

| | | |
|---|---|---|
| 59-148932 | 8/1984 | Japan . |
| 5-58087 | 3/1993 | Japan . |
| 8-267969 | 10/1996 | Japan . |

OTHER PUBLICATIONS

Rohen et al., "Dual–Stripe Magnetic Card", *IBM Technical Disclosure Bulletin*, vol. 22, No. 12, May 1980.

*Primary Examiner*—Anita Pellman Gross
*Assistant Examiner*—Karl Frech
*Attorney, Agent, or Firm*—Millen, White, Zelano, & Branigan, P.C.

[57] ABSTRACT

A transaction card includes at least two read-only magnetically encoded stripes encoding different data in accordance with standard data encryption protocols readable by conventional transaction card reading systems. The stripes are associated with areas of the card which may have different indicia, such as, for example, being different colors or different textures. In accordance with one embodiment, superimposed upon the card may be two sets of raised printed indicia including, for example, the transaction card number, the expiration date and the name of the card user. One set of the raised printed indicia is inverted with respect to the other set so as to indicate to the user which one of the magnetic stripes is being processed. In accordance with another embodiment, only one set of raised letters is used; the other set being flush with the surface of the card if there are two sets. In this way, magnetically encoded information on the same transaction card may be segregated at the point of sale. The transaction card is readable by standard, existing readers and the information is processed for invoicing by standard processing systems to preferably generate a single statement with two groups of charges, one relating to each magnetically encoded stripe.

20 Claims, 6 Drawing Sheets

5,883,377

MULTIPLE MAGNETIC STRIPE TRANSACTION CARDS AND SYSTEMS FOR THE UTILIZATION THEREOF

FIELD OF THE INVENTION

The present invention relates to multiple magnetic stripe transaction cards and systems for the use thereof. More particularly, the present invention relates to magnetic stripe transaction cards usable with currently installed conventional reading and processing systems.

BACKGROUND OF THE INVENTION

Currently, all transactions made utilizing a transaction card with one magnetic stripe must be charged against one information set contained on that magnetic stripe. Examples of such cards are conventional credit cards, ATM cards and frequent flyer cards. For non-magnetic stripe readers, transactions are charged against one set of raised account numbers. Presently, single cards do not have multiple account capability so as to be separable into different accounts at points of sale. Moreover, as transaction cards multiply, so do difficulties such as the physical inconvenience of carrying the cards, the difficulties in consolidating rebates from multiple accounts, and the inconveniences of receiving more than one bill and writing more than one check. In addition, there is frequently a need to separate transactions for specific categories of business expenses. This is especially the case for small business owners who need to separate transactions for accounting purposes and employees who must separate transactions for reimbursement purposes.

The current credit cards with one magnetic stripe cannot separate transactions at the point of sale. To configure them to do so requires advanced technologies such as "smart" cards which require complete reconfiguration of merchant reader equipment and which, in addition to requiring a complete change-out of the installed processing base, would require retraining of all merchant users. Introduction of advanced technologies to separate transactions at the point of sale would result in installation of unproven systems which may be susceptible to fraud as well as installation of systems requiring modification of strict VISA/MasterCard standards. Moreover, extensive research and development and extensive investment in tooling for manufacturing would be necessary to implement using advanced technologies for separating transactions at the point of sale.

SUMMARY OF THE INVENTION

It is an object of this invention to provide a new and improved transaction card having at least first and second read-only data stripes thereon.

In accordance with this object and other objects, a transaction card of standard dimensions comprises a substrate having first and second areas with different visual indicia. A first read-only coded stripe is disposed in the first area and a second read-only coded stripe is disposed in the second area. The first and second stripes encode different data in accordance with standard data encryption protocols, readable by conventional retail, transaction card reading systems.

In accordance with a further aspect of the invention, the invention is directed to a system including transaction cards readable by standard retail transaction card readers, the standard retail transaction card readers themselves and central information processors connected to the readers. Each transaction card includes a substrate having first and second areas with different visual and/or tactile indicia. A first read-only data stripe is disposed in the first area and a second read-only data stripe is disposed in the second area. The first and second data stripes encode different data in accordance with standard data encryption protocols, readable by the standard transaction card readers. The standard card readers are connected to a central processor which includes at least one invoice-generating processor. The invoice-generating processor has a dual output for each transaction card with the dual output having first output data related to the data encoded on the first magnetic stripe and second output data relating to data encoded on the second magnetic stripe.

DETAILED DESCRIPTION

Figure 1:
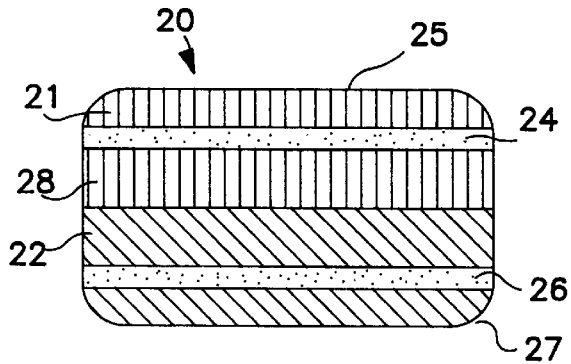
FIG. 1 is rear, planar view of a first embodiment of a transaction card configured in accordance with the principles of the present invention, the first embodiment being preferred.

Referring now to FIGS. 1–6, there is shown in a first and preferred embodiment, a transaction card 20, comprising a substrate having the approximate length, width and thickness of a standard VISA/MasterCard/American Express/Discover credit card. FIG. 1 illustrates the rear view of the transaction card 20 wherein the transaction card has a first area 21 and a second area 22. The second area 22 is visually distinctive from the first area 21. For example, as illustrated by the diagonal shading, the second area 22 may be green in color and the first area 21 may be brown in color. The particular color selected by the vendor of the credit card is optional and it is only important that the user be able to visually distinguish the first area 21 from the second area 22. The first area 21 may also optionally have a different tactile feel from the second area 22. Again, it is only important that the first area 21 be distinguishable from the second area 22.

The first area 21 has a first magnetic stripe 24 adhered thereto in accordance with standard transaction card dimensions. In other words, the first magnetic stripe 24 is disposed ¼-inch from the edge 25 of the transaction card 20. In accordance with the present invention, the first magnetic stripe 24 is encrypted with standard read-only data that the usual customer transaction card is encrypted with, i.e., data that may be read by a merchant swipe reader, an ATM-like reader or an older imprint-type reader. An example of the read-only encoded data on the stripe 24 is data identifying the card user and the category of the account to be charged upon using the transaction card 20.

Disposed in the second area 22 is a second magnetic stripe 26 which is also positioned ¼-inch from the edge 27 of the transaction card 20. The second magnetic stripe 26 is encrypted with data different from the data of the first magnetic stripe 24 so that when the card 20 is used, separation of transactions at the point of sale may be accomplished. For example, the first stripe 24 may be for business expenses and the second stripe 26 for personal expenditures, or the first stripe 24 may be for necessities and the second stripe 26 for luxuries.

Figure 2:
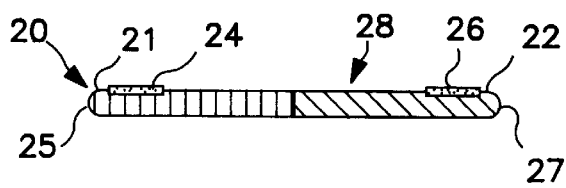
FIG. 2 is an end view of the transaction card of FIG. 1.

Referring now to FIG. 2, it is seen that the first and second magnetic stripes 22 and 26 are on the same surface 28, i.e., the rear surface of the transaction card 20.

Figure 3:
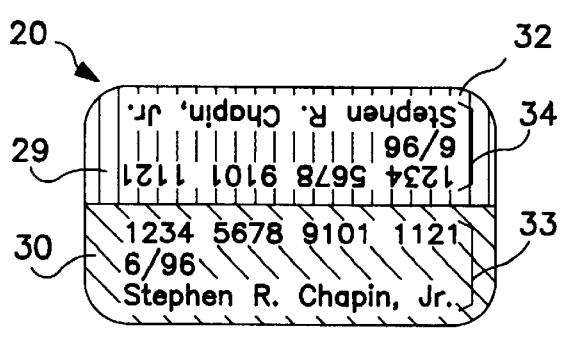
FIG. 3 is a front view of the transaction card of FIGS. 1 and 2.

In FIG. 3, the front surface 29 of the transaction card 20 is shown. In accordance with the illustrated embodiment, the front surface 29 is divided into third and fourth areas 30 and 32 which have different visual or tactile indicia. Preferably, the third area 30 is the same color or texture as the first area 21 and the fourth area 32 is of the same visual or tactile indicia as the second area 22 on the rear side 28 of the transaction card 20. The front side 29 of the transaction card 20 has a first set of raised printed indicia 33 and a second set of raised printed indicia 34 which is inverted with respect to the printed indicia 33 so as to inform the person using the card as to which of the magnetic strips 24 and 26 is being read. As is seen in FIG. 3, since the raised printed indicia 33 in the green third area 30 is oriented right side up for reading, it is known to the user and to the merchant that the magnetic stripe 26 in the green area 21 is being read. In accordance with an embodiment of the invention, which may be preferred, only one set of the printed indicia 33 or 34 is raised.

Figure 4:
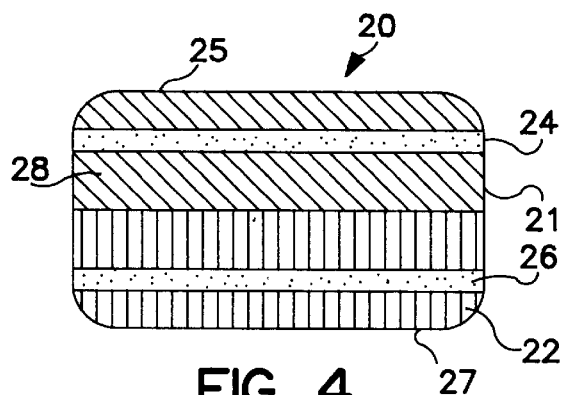
FIG. 4 is a rear view of the transaction card in accordance with the first embodiment of the present invention of FIGS. 1–3, but shown inverted.
Figure 5:
FIG. 5 is an end view of the transaction card as shown in FIG. 4.
Figure 6:
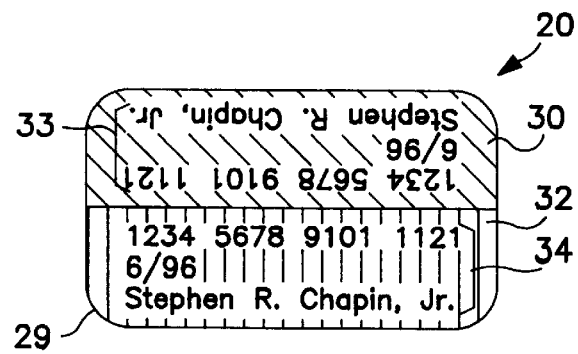
FIG. 6 is a front view of the transaction card of FIGS. 4 and 5 shown inverted from the FIG. 3 orientation.
Figure 7:
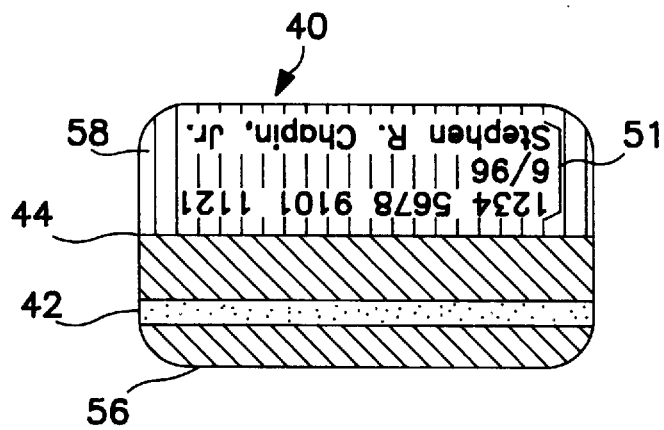
FIG. 7 is a planar view of a first side of a second embodiment of a transaction card configured in accordance with the principles of the present invention.
Figure 8:
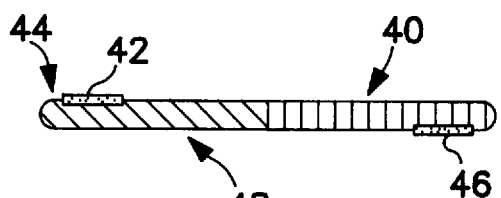
FIG. 8 is an end view of the transaction card of FIG. 7.
Figure 9:
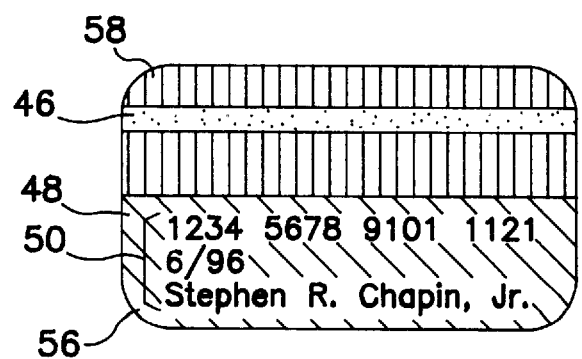
FIG. 9 is a planar view of the second side of the transaction card of FIGS. 7 and 8.
Figure 10:
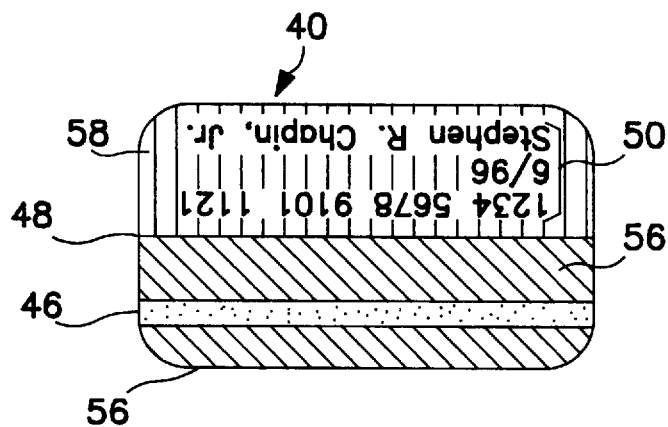
FIG. 10 is a planar view of the second side of the transaction card of FIGS. 7–9, but showing the card inverted with respect to FIG. 7.
Figure 11:
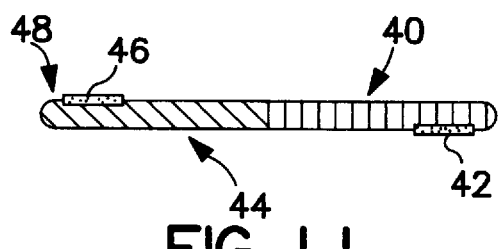
FIG. 11 is an end view of the card as shown in FIG. 10.

Referring now to FIGS. 4–6, the orientation of the transaction card 20 is reversed so that the raised printed indicia 33 is inverted and the raised printed indicia 34 is oriented for reading. This informs the user and merchant that the transaction card 20 is oriented so that the first stripe 24 rather than the second stripe 26 is positioned for reading by the transaction card reader.

Referring now to FIGS. 7–12, a second embodiment 40 of the transaction card in accordance with the present invention is illustrated wherein a first magnetic stripe 42 is disposed on a first side 44 of the transaction card 40 and a second magnetic stripe 46 disposed on a second side 48 of the transaction card. As with the first embodiment, the stripes 42 and 46 have encrypted thereon different read-only data identifying different categories of accounts to be charged.

Figure 12:
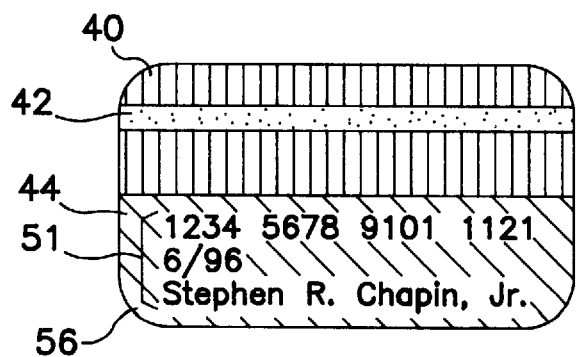
FIG. 12 is a planar view of the first side of the transaction card inverted with respect to FIG. 9.

With this arrangement, raised printed indicia 50 on the second side 48 of the transaction card 40 relates to the first magnetic stripe 42, and raised written indicia on the first side 44 of the transaction card 40 relates to the second magnetic stripe 51. In other words, when the raised printed indicia 50 appears to the person processing the card right side up (FIG. 9), then the first magnetic stripe 42 is being read and, when the raised printed indicia 51 appears right side up, then the second magnetic stripe 46 is being read (FIG. 12).

As with the first embodiment, first and second background colors 56 and 58 are preferably used with the card 40. The first color 56 links first stripe 42 to raised printed indicia 50 and the second color 58 links the second stripe 46 to the raised printed indicia 51. Any colors may be used and it is only important that the two lines of data encrypted on stripes 42 and 46 the card 40 be visually distinguishable. This also may be accomplished by words such as using the term "BUSINESS" on side 44 of the card and the term "PERSONAL" on the second side 48 or by using a different tactile feel. In a modification of the second embodiment, the first side 44 of the transaction card 40 may be of entirely one color and the second side 48 be of another color.

It is also within the scope of this invention to have transaction cards (not shown) that include read-only magnetic stripes extending perpendicular to the direction of the magnetic stripes 24 and 26 of the transaction card 20 and perpendicular to the magnetic stripes 42 and 46 of the transaction card 40 so as to provide additional read-only data for various purposes. These magnetic stripes may be in lieu of or in addition to the magnetic stripes of transaction cards 20 and 40 and may be on the same or opposite sides of the transaction cards.

Figure 13:
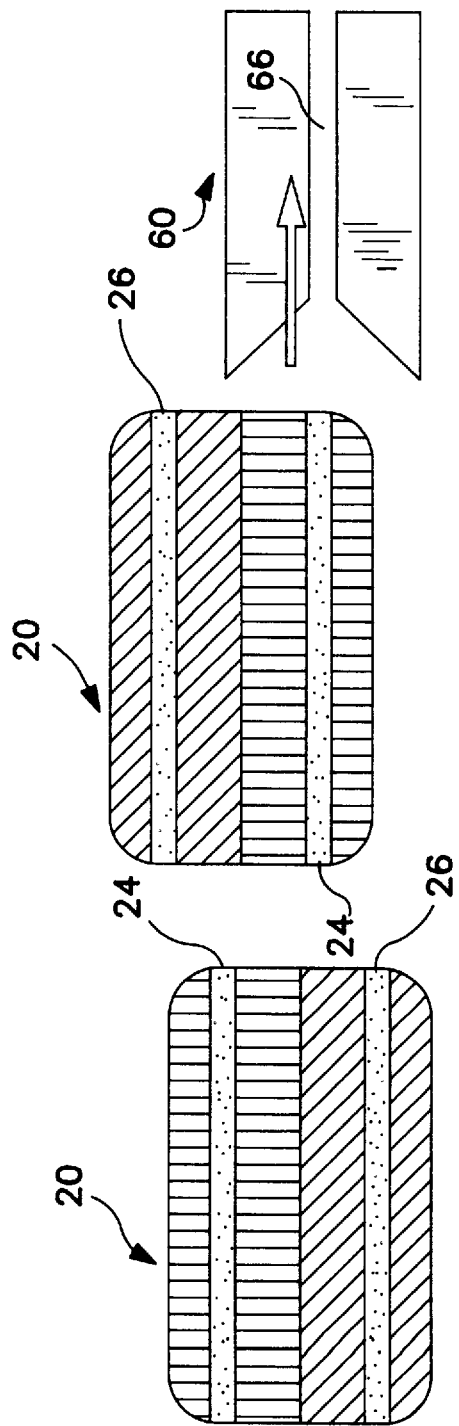
FIG. 13 is a diagrammatical view illustrating either of the embodiments of the transaction card of FIGS. 1–12 being used with a merchant swipe reader.
Figure 14:
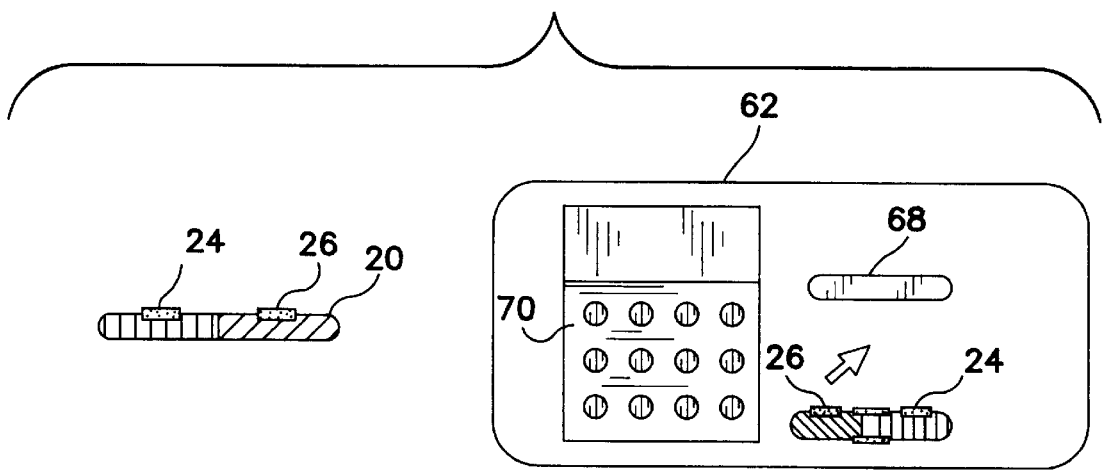
FIG. 14 is a diagrammatical view showing either of the embodiments of the transaction cards of FIGS. 1–12 being used with an ATM-like reader.
Figure 15:
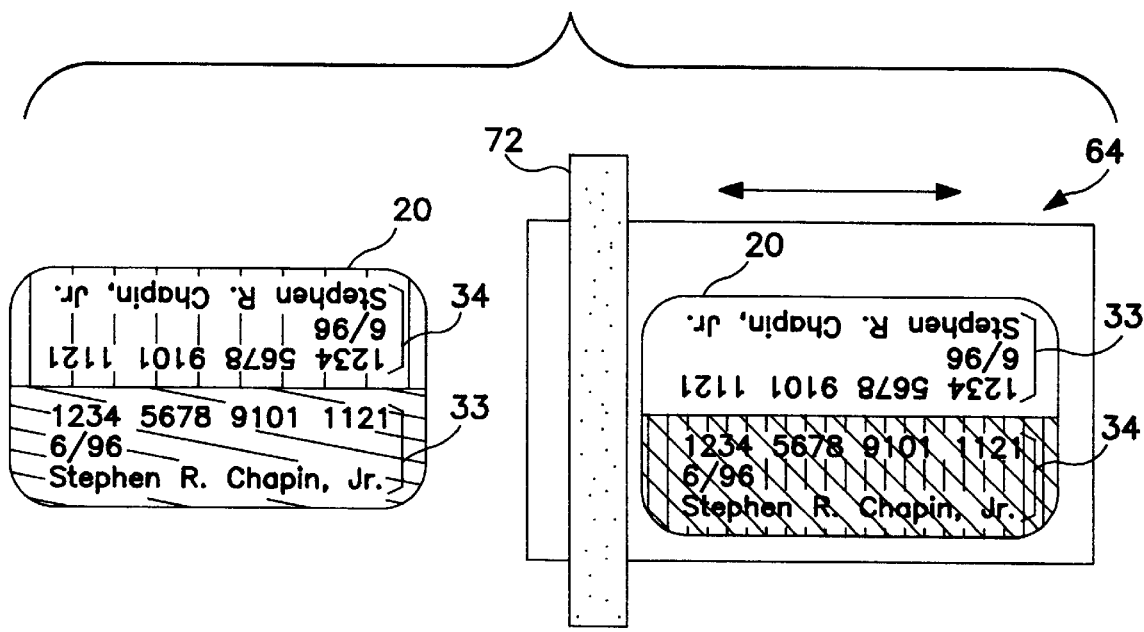
FIG. 15 is a diagrammatical view showing either of the embodiments of the transaction cards of FIGS. 1–12 being used with an impact-type reader.

Referring now to FIGS. 13–15, there are shown a variety of readers for transaction cards, such as the cards 20 and 40. The readers are conventional readers employed presently at retail establishments and banks. In FIG. 13, a merchant swipe reader 60 is shown; in FIG. 14, an ATM-type reader 62 is shown; and in FIG. 15, an imprint-type reader 64 is shown. In each case, the card 20 of the preferred embodiment is shown being used. With the merchant swipe reader 60, the card 20 is oriented so that either the first magnetic stripe 24 or the second magnetic stripe 26 is received in a slot 66, while in the ATM reader 62, either the first or second magnetic stripe is positioned for reading in a slot 68 in coordination with operation of a keypad 70. With the imprint-type reader 64, a slider 72 engages either the raised printed indicia 33 or the raised printed 34 and imprints the indicia on a written charge slip.

Figure 16:
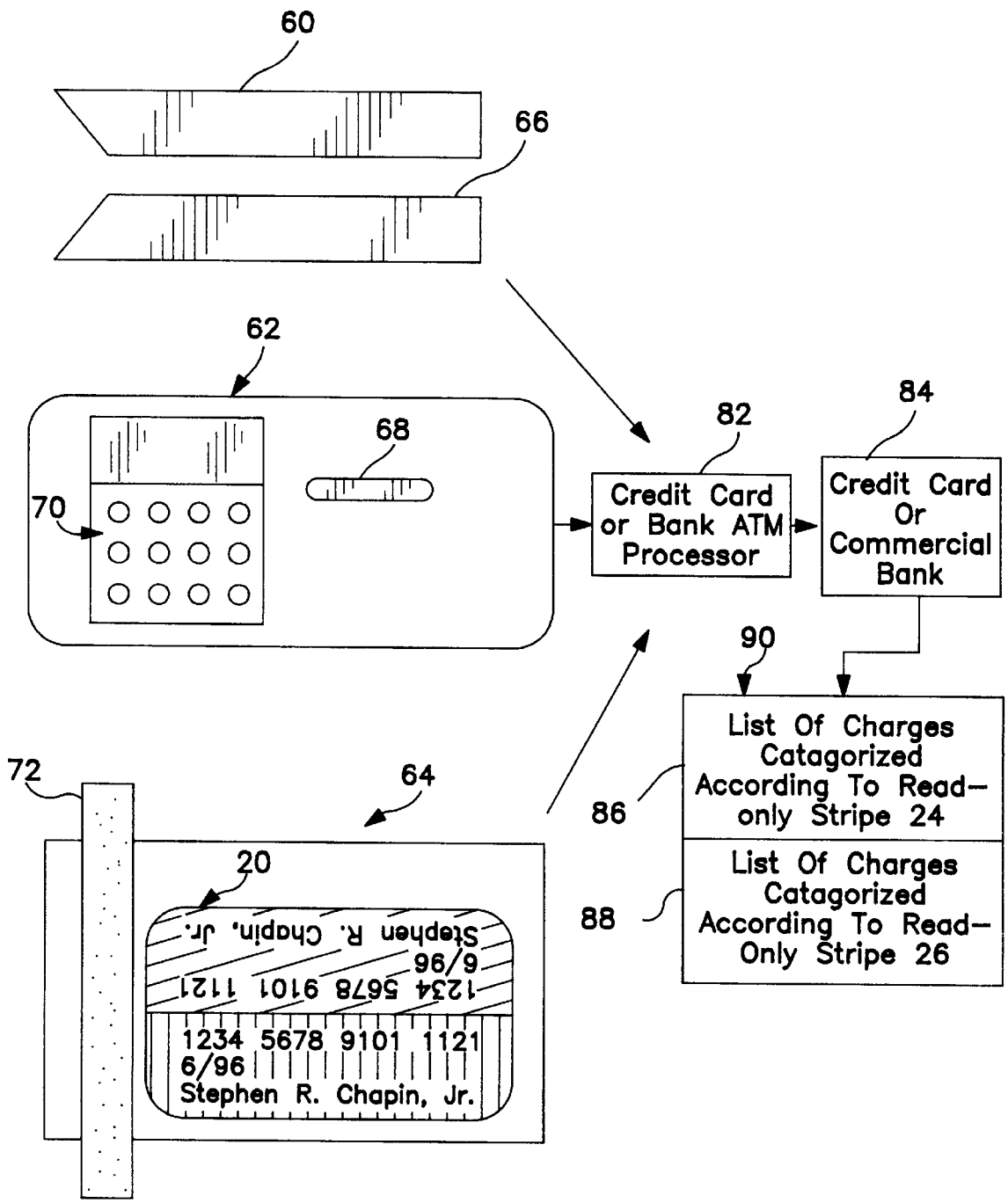
FIG. 16 is a diagrammatical view showing any of the readers of FIGS. 13–15, being connected with a currently existing transaction card processing system.

Referring now to FIG. 16 where a system for processing the transaction cards 20 or 40 is shown, a multiplicity of merchant swipe readers 60, ATM-type readers 62 and imprint readers 64 are connected to a credit card processor or bank ATM processor 82 in accordance with conventional currently used arrangements. The processor 82 in turn communicates with a credit card bank or commercial bank 84 which generates two listings 86 and 88 on the card user's statement 90. The listing 86 is for charges to the account identified by data encrypted on the first magnetic stripe 24 and identified by the first area 21 on the back of the transaction card 20 and the third area 30 on the front of the transaction card 20, while the listing 88 corresponds to the data encrypted on the second magnetic stripe 26 in the second area 22 on the back surface 28 of the transaction card and the fourth area 32 on the front surface 29 of the transaction card. Likewise, when the second embodiment of the transaction card 40 is used, the listing 86 includes charges associated with the first magnetic strip 42 on the first side 44 and the raised printed indicia 50 on the second side 44 of the transaction card while the listing 88 includes charges associated with the second magnetic strip 46 on the second side 48 of the transaction card and the raised indicia 51 on the first side 44. In this way, the listings 86 and 88 are produced in the single statement 90, which single statement may be divided by the credit card user at the credit card user's convenience.

In accordance with another embodiment of the invention, if one of the stripes 24 or 26 is for ATM data, then the information relating to ATM transactions may appear on a separate statement. There may be other arrangements in which separate statements are preferred.

By configuring transaction cards with two magnetic data strips, such as the magnetic data strips 24 and 26 on transaction card 20 or 42 and 46 on transaction card 40, numerous advantages result from the credit card user having the ability to separate transactions at the point of sale while maintaining one card. One card provides the physical convenience of carrying fewer cards while allowing the user such conveniences as consolidating rebates from multiple accounts such as air miles, etc. and receiving a single consolidated bill for which a single check may be written for payment.

Reasons for separating transactions may be of special significance for small business owners who need specific categorization of business expenses which can be separated for accounting purposes. Employees can use the single transaction cards to separate business expenses that will require reimbursement from personal expenses. For budgeting purposes, items which need to be tracked separately can be charged against separate magnetic stripes while separate magnetic stripes allow staging of payments for cashflow because payment periods can be staggered, allowing more frequent smaller payments, rather than a single large payment. Another advantage is the ability to assign specific types of payment to specific lines of credit. For example, charging emergency uses, such as healthcare expenses, to one of the magnetic stripes and personal uses to the other magnetic stripe. These are merely exemplary of advantages that the credit card, according to the present invention, provides to the credit card user.

With respect to credit card banks, credit card banks which distribute transaction cards, such as the cards 20 and 40, have the advantage of garnering additional market share by replacing at least one other transaction card in the user's array to thereby become a card of choice. In addition, business/personal card synergies are achievable, benefitting both users and credit card banks. For example, a strong corporate card can add all of its business customers to its personal card portfolio by providing a combination business/personal card (and vice-versa). Such an advantage is even more compelling when card rebates, such as airline miles, are consolidated for both accounts on a card.

Deployment of credit cards, such as the credit cards 20 and 40, is relatively easy to implement because the cards themselves are relatively inexpensive to produce since it is less expensive to manufacture single credit cards with dual stripes than to manufacture two separate one-stripe cards. Moreover, only minor, if any, revisions are necessary to current VISA/MasterCard regulations. In addition, the current installed base of credit card merchant reader equipment, including both magnetic stripe and raised letter technology can continue to be used with minimal, if any, retraining of merchants. Since the transaction cards of the present invention use current transaction and processing systems, there exists a track record of resistance to fraud, which any system requiring revision of the currently installed processing systems would require years to achieve.

From the foregoing description, one skilled in the art can easily ascertain the essential characteristics of this invention, and without departing from the spirit and scope thereof, can make various changes and modifications of the invention to adapt it to various usages and conditions.

I claim:

1. An indivisible transaction card comprising:
   a standard size and configuration for the transaction card wherein the transaction card is an indivisible card readable by standard transaction card readers and includes a first face and a second face;
   the first face being divided longitudinally into a first area and a second area;
   the second face being divided longitudinally into a third area and a fourth area;
   first indicia identifying an authorized user of the transaction card, the first indicia occupying the first area on the front of the card;
   second indicia identifying the authorized user of the transaction card, the second indicia occupying the second area on the front of the card;
   a first read-only magnetic stripe associated with the first indicia and a first account, the first magnetic stripe occupying the third area on the back of the card; and
   a second read-only magnetic stripe associated with the second indicia and a second account, the second magnetic stripe occupying the fourth area on the back of the card, whereby the indivisible transaction card accesses two accounts associated with the same authorized user via a standard transaction card reader.

2. The indivisible transaction card of claim 1, wherein the first indicia is inverted with respect to the second indicia and wherein the first stripe relating to the first indicia is disposed in an area facing opposite the area of the second indicia and the second stripe relating to the second indicia is disposed in an area facing opposite the area of the first indicia, whereby when the transaction card is in a first orientation, the first indicia is uninverted and the first magnetic stripe is read and when the card is in a second orientation, opposite the first orientation, the second indicia is uninverted and the second magnetic stripe is read.

3. The indivisible transaction card of claim 2, wherein other than being inverted with respect to one another, the first and second indicia are identical.

4. The indivisible transaction card of claim 3, wherein the areas containing the first indicia and first magnetic stripe are of a first color and the areas containing the second indicia and second magnetic stripe are of a second color.

5. The indivisible transaction card of claim 2, wherein the areas containing the first indicia and first magnetic stripe are of one color and the areas containing the second indicia and second magnetic stripe are of another color.

6. The indivisible transaction card of claim 1, wherein first indicia is on an area facing opposite the area occupied by the second magnetic stripe and the second indicia is in an area facing opposite the area occupied by the first magnetic stripe.

7. The indivisible transaction card of claim 6, wherein the area containing the first magnetic stripe are of one color and the area containing the second magnetic stripe are of another color.

8. The indivisible transaction card of claim 6, wherein the areas containing the first indicia and first magnetic stripe are of a first color and the areas containing the second indicia and second magnetic stripe are of a second color.

9. The indivisible transaction card of claim 1, wherein the areas containing the first indicia and first magnetic stripe are of a first color and the areas containing the second indicia and second magnetic stripe are of a second color.

10. The indivisible transaction card of claim 1, wherein the areas containing the first indicia and first magnetic stripe are of a first color and the areas containing the second indicia and second magnetic stripe are of a second color.

11. The indivisible transaction card of claim 1, wherein the first and second magnetic stripes are on opposite sides of the card; wherein the first indicia is inverted with respect to the second indicia, and wherein the first stripe relating to the first indicia is disposed in an area facing opposite the area of the second indicia and the second stripe relating to the second indicia is disposed in an area facing opposite the area of the first indicia, whereby the transaction card is in a first orientation, the first indicia is uninverted and the first magnetic stripe is read and when the card is in a second orientation, opposite the first orientation, the second indicia is uninverted and the second magnetic stripe is read.

12. The indivisible transaction card of claim 1, wherein the first and second magnetic stripes are on opposite sides of the card, and wherein the first indicia is in an area facing opposite the area occupied by the second magnetic stripe and the second indicia is in an area facing opposite the area occupied by the first magnetic stripe.

13. A system including standard retail transaction card readers with central information processors being connected thereto and a plurality of indivisible transaction cards readable by the standard retail transaction card readers, the system comprising:

each indivisible transaction card having a first face and a second face and each indivisible transaction card being of standard size and configuration for transaction cards, wherein the transaction card is readable in an indivisible state by the standard transaction card readers;

each first face being divided into a first area and a second area;

each second face being divided into a third area and a fourth area;

first indicia identifying an authorized user of the transaction card, the first indicia occupying one of the areas on the first face of the card;

second indicia identifying the authorized user of the transaction card, the second indicia occupying the other area on the first face of the card;

a first read-only magnetic stripe associated with the first indicia and a first account, the first magnetic stripe occupying one of the areas on the second face of the card;

a second read-only magnetic stripe associated with the second indicia and a second account, the second magnetic stripe occupying the other area on the second face of the card, whereby the indivisible transaction card accesses two accounts associated with the same authorized user;

the standard retail transaction card readers or ATM bank card readers being connected to an invoice generating processor; and statements being generated by the invoice generating processor for each card, the statements having information corresponding to the first read-only data stripe and information corresponding with the second read-only data stripe.

14. The system of claim 13, wherein the first indicia is inverted with respect to the second indicia and wherein the first stripe relating to the first indicia is disposed in an area facing opposite the area of the second indicia and the second stripe relating to the second indicia is disposed in an area facing opposite the area of the first indicia whereby when the transaction card is in a first orientation, the first indicia is uninverted and the first magnetic stripe is read and when the card is in a second orientation, opposite the first orientation, the second indicia is uninverted and the second magnetic stripe is read.

15. The system of claim 14, wherein other than being inverted with respect to one another, the first and second indicia are identical.

16. The system of claim 15, wherein the areas containing the first indicia and first magnetic stripe are of one color and the areas containing the second indicia and second magnetic stripe are of another color.

17. The system of claim 13, wherein first indicia is on an area facing opposite the area occupied by the second magnetic stripe and the second indicia is in an area facing opposite the area occupied by the first magnetic stripe.

18. The system of claim 17, wherein the area containing the first magnetic stripe is of one color and the area containing the second magnetic stripe is of another color.

19. The system of claim 13, wherein the areas containing the first indicia and first magnetic stripe are of one color and the areas containing the second indicia and second magnetic stripe are of another color.

20. The system of claim 13, wherein the areas containing the first indicia and first magnetic stripe are of one color and the areas containing the second indicia and second magnetic stripe are of another color.

* * * * *